Jan. 7, 1969 W. E. WILCOX 3,420,497
MISALIGNABLE FLUID-TIGHT COUPLING
Filed July 28, 1966 Sheet 1 of 4

INVENTOR.
WAYNE E. WILCOX
BY George Rupnovich
HIS ATTORNEY

INVENTOR.
WAYNE E. WILCOX
HIS ATTORNEY

INVENTOR.
WAYNE E. WILCOX

United States Patent Office 3,420,497
Patented Jan. 7, 1969

3,420,497
MISALIGNABLE FLUID-TIGHT COUPLING
Wayne E. Wilcox, McKees Rocks, Pa., assignor, by mesne assignments, to SRM Company, a corporation of Pennsylvania
Filed July 28, 1966, Ser. No. 568,502
U.S. Cl. 251—149.6          6 Claims
Int. Cl. F16l 27/04

ABSTRACT OF THE DISCLOSURE

A positive lock coupling is disclosed in which radially reciprocable locking balls are moved radially inwardly to contact the nipple portion of the coupling and retain the nipple within the housing or are moved radially outwardly to release the nipple portion of the coupling. The nipple of the coupling is formed with a spherical external surface which is enlarged with respect to the cylindrical portion of the nipple. The locking balls of the housing contact the spherical portion of the nipple surface well outwardly radially of the cylindrical portion of the nipple so that the nipple can misalign itself with respect to the housing. The housing has a funnel-like end portion which extends into close proximity to the locking balls to further facilitate misalignment.

---

The present invention relates to a fluid-tight coupling, and more particularly, to a fluid-tight coupling in which the conduits through which fluid flows to each half of the coupling may be misaligned to a marked degree when the coupling is engaged without leakage of fluid therefrom.

In modern fluid-tight couplings, the use of a coupling in which a plurality of locking balls are utilized to axially retain a nipple within a coupling housing has become prevalent. In these couplings, the locking balls within the housing are forced radially inwardly to lock about a collar of the nipple. When thus locked, the nipple may not be withdrawn axially from the housing. Further, when the locking balls are permitted to move radially outwardly relative to the housing, the nipple may be axially withdrawn from the housing.

In the foregoing type of coupling, the precise alignment of the nipple and the housing were necessary in order to create a sealing connection between the nipple and the housing. Further, in order for the locking effect of the locking balls to occur, the nipple had to be aligned with the housing so that their axes were coincident.

In the present invention, the nipple of the fluid-tight coupling has been constructed with a cylindrical external surface that terminates in a bulbous cylindrical section. When the nipple is inserted into the housing, the locking balls lock about the bulbous cylindrical section of the nipple external surface so that the nipple may be canted axially relative to the housing whereby the housing and the nipple may be axially misaligned.

Further, initial engagement of the nipple to the housing does not require precise axial alignment of the nipple and the housing, but rather, the coupling can be engaged while it is axially misaligned.

In one form of the present invention, the housing of the coupling may be valved so that the fluid passage through the housing can be closed when the nipple is withdrawn from the housing. When the nipple is inserted into the housing, the fluid flow passage through the housing is automatically opened by the valve within the housing.

With the foregoing considerations in mind, it is an object of the present invention to provide a misalignable fluid-tight coupling.

Another object of the present invention is to provide a fluid-tight coupling in which the housing and nipple may be engaged even though they are not in axial alignment.

Another object of the present invention is to provide a fluid-tight coupling wherein misalignment of the housing and nipple axially may occur while the coupling is engaged.

Another object of the present invention is to provide a novel nipple for a fluid-tight coupling which permits misalignment of the nipple and the housing.

These and other objects of the present invention will become apparent as this description proceeds in conjunction with the accompanying drawings.

Figure 1:
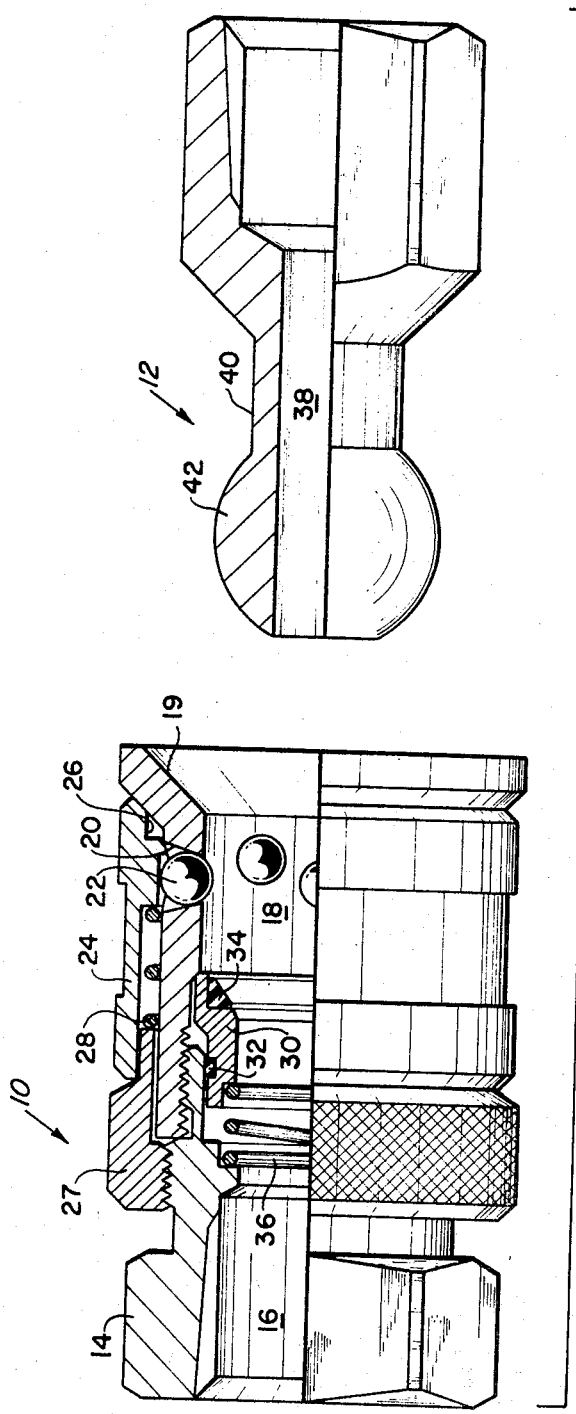
FIGURE 1 is an exploded view, in partial section, of the fluid-tight coupling of the present invention in the disengaged position.
Figure 2:
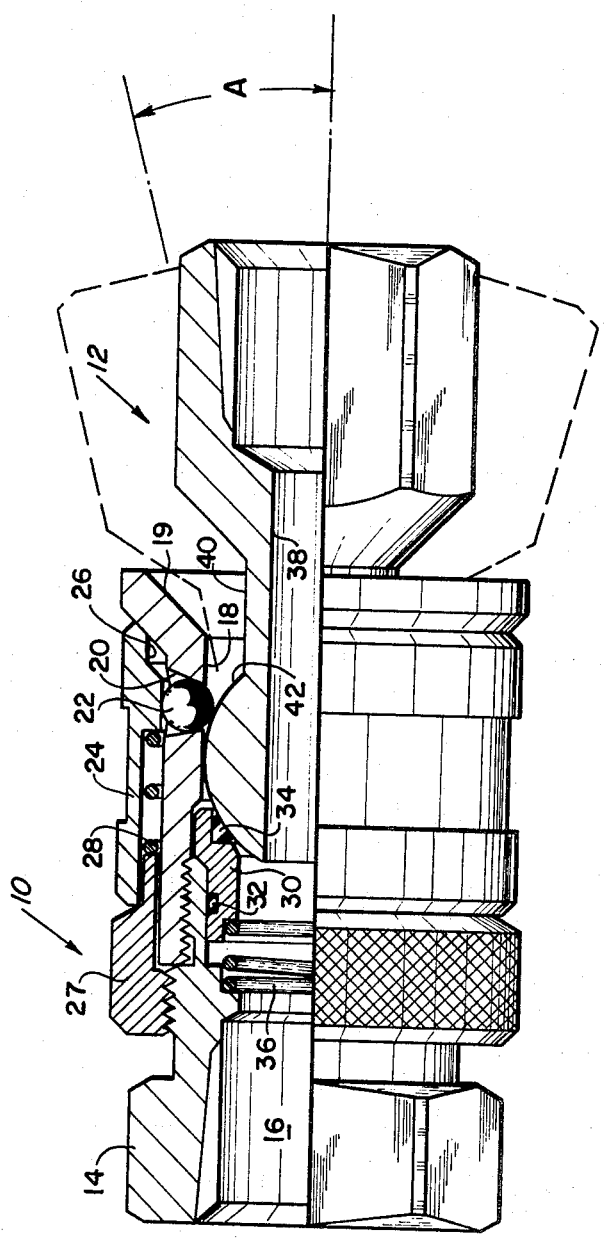
FIGURE 2 is a view, in partial section, of the coupling of FIGURE 1 in the engaged position.

Referring to the drawings, and first to FIGURES 1 and 2, the coupling shown in the disengaged position in FIGURE 1 is formed from a housing 10 and a nipple 12 which is received within the housing 10 to engage the coupling.

The housing 10 has a body portion 14 through which is formed a generally cylindrical flow passage 16. At the other end of the housing 10 is a generally cylindrical nipple-receiving passage 18 having flared end walls 19.

Within the housing body 14 at the nipple-receiving passage 18 are a plurality of radial holes 20 formed through the nipple-receiving passage. A plurality of locking balls 22 are positioned, one in each of the holes 20, so that the locking balls 22 are movable radially inwardly so that a portion of the locking balls 22 enters the nipple-receiving passage 18 and are also movable radially outwardly so that the locking balls 22 are completely radially withdrawn from the nipple-receiving passage 18.

A reciprocating sleeve 24 is formed over the housing body 14 and forces the locking balls 22 radially inwardly into the nipple-receiving passage 18 when the sleeve is in the positions shown in FIGURES 1 and 2. The reciprocating sleeve 24 has an end groove 26 formed therein and when the reciprocating sleeve is moved so that the end groove 26 overlies the locking balls 22, the locking balls may be radially withdrawn from the nipple-receiving passage 18 to facilitate removal of the nipple 12 from the housing 10 as hereinafter more fully appears.

A lock collar 27 is threaded over the housing body 14 and serves to lock the reciprocating sleeve 24 in the positions shown in FIGURES 1 and 2 to thereby maintain the locking balls 22 radially inwardly in the nipple-receiving passage 18. A helical spring 28 disposed between the housing body and the reciprocating sleeve 24 urges the reciprocating sleeve 24 to the position where it maintains locking balls 22 radially inwardly in the nipple-receiving passage 18.

Within the flow passage 16 of the housing 10 is a seal means cylinder 30 which slides upon the internal cylindrical surface of flow passage 16. The seal means cylinder 30 has an O-ring 32 carried therein to provide a sliding sealing connection between the cylinder 30 and the cylindrical internal surface of the flow passage 16. At the end of seal means cylinder 30 is a seal ring 34 which sealingly abuts the nipple 12 when the coupling is in the engaged position as shown in FIGURE 2. A spring 36 urges the seal means cylinder 30 axially toward the nipple-receiving passage flared end walls 19 as shown in FIGURE 1.

The nipple of the present invention has a cylindrical flow passage 38 formed therethrough. The nipple 12 has a cylindrical external surface 40 which is of a diameter substantially smaller than the diameter of the nipple-receiving passage 18 of housing 10. The sylindrical external surface 40 of nipple 12 terminates in a bulbous spherical section 42.

The spherical section 42 on the end of nipple 12 is of constant diameter. The diameter of spherical section 42 is of such size that when the nipple is inserted within the nipple-receiving passage 18 of housing 10, the spherical surface 42 of nipple 12 is contiguous to the cylindrical internal surface of the nipple-receiving passage 18.

When the nipple 12 is inserted into the housing 10 as shown in FIGURE 2, the major portion of the spherical section 42 of nipple 12 is inserted axially inwardly of the locking balls 22 in housing 10. This insertion of the spherical section 42 within the nipple-receiving passage 18 permits the locking balls 22 to be forced radially inwardly to contact the spherical surface of spherical section 42. Since the major portion of the spherical section 42 is axially inwardly of the locking balls, the contact between the locking balls 22 and the spherical surface of section 42 prevents axial withdrawal of the nipple 12 unless the locking balls 22 are radially retracted.

When the nipple 12 is inserted into the housing 10, the spherical section 42 of nipple 12 contacts the seal ring 34 of seal means cylinder 30 to provide a sealing connection therebetween. The seal means cylinder 30 moves axially relative to the housing body 14 as best shown in FIGURE 2, so that the helical spring 36 urges the cylinder 30 against the nipple 12. It will be seen that because of the O-ring 32 and seal ring 34, the flow passage 16 of housing 10 and the flow passage 38 of nipple 12 are in fluid communication (FIGURE 2) without any leakage of fluid being possible.

As shown in phantom lines in FIGURE 2, the nipple 12 may be axially misaligned relative to the housing 10. Because of the relatively small size of the diameter of the nipple cylindrical external surface 40 and because of the position of the locking balls 22 which are near the end of nipple-receiving passage 18, the misalignment between the axis of the housing 10 and the nipple 12 may be as great as angle A, which may be fifteen degrees or more of axial misalignment between housing 10 and nipple 12. The flaring end walls 19 of nipple-receiving passage 18 promote the misalignment capabilities of the coupling.

The housing 10 of the coupling of the present invention is generally conventional except for the seal means cylinder 30 and associated O-ring 32 and seal ring 34. As in the conventional couplings, the reciprocating sleeve 24 maintains the locking balls 22 radially inwardly until the nipple 12 is inserted. At that time, the reciprocating sleeve 24 is reciprocated axially against the force of spring 28 to permit the locking balls 22 to enter the end groove 26 and thereby permit insertion of the nipple 12 into the nipple-receiving passage 18. After the nipple has been inserted, the reciprocating sleeve 24 is returned to the position shown in FIGURE 2 to thereby lock the nipple within the housing 10. At that time, the lock collar 27 is threaded against the reciprocating sleeve 24 to maintain the coupling in the locked position.

Figure 3:
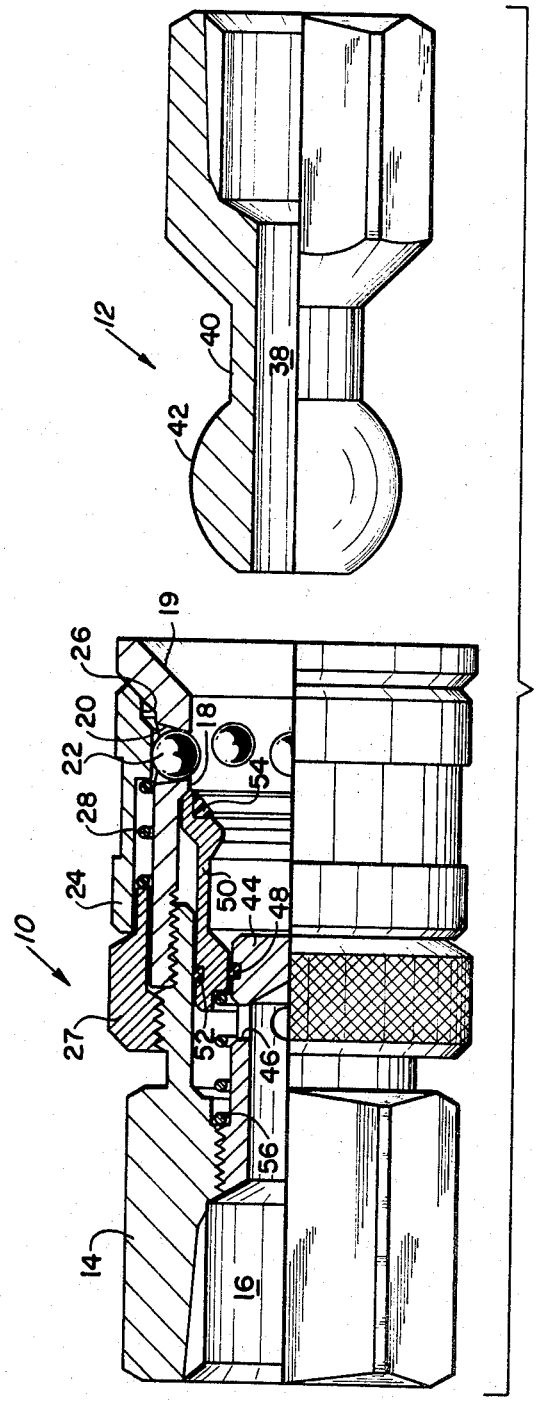
FIGURE 3 is an exploded view, in partial section, of a valved coupling constructed in accordance with the present invention and shown in the disengaged position.
Figure 4:
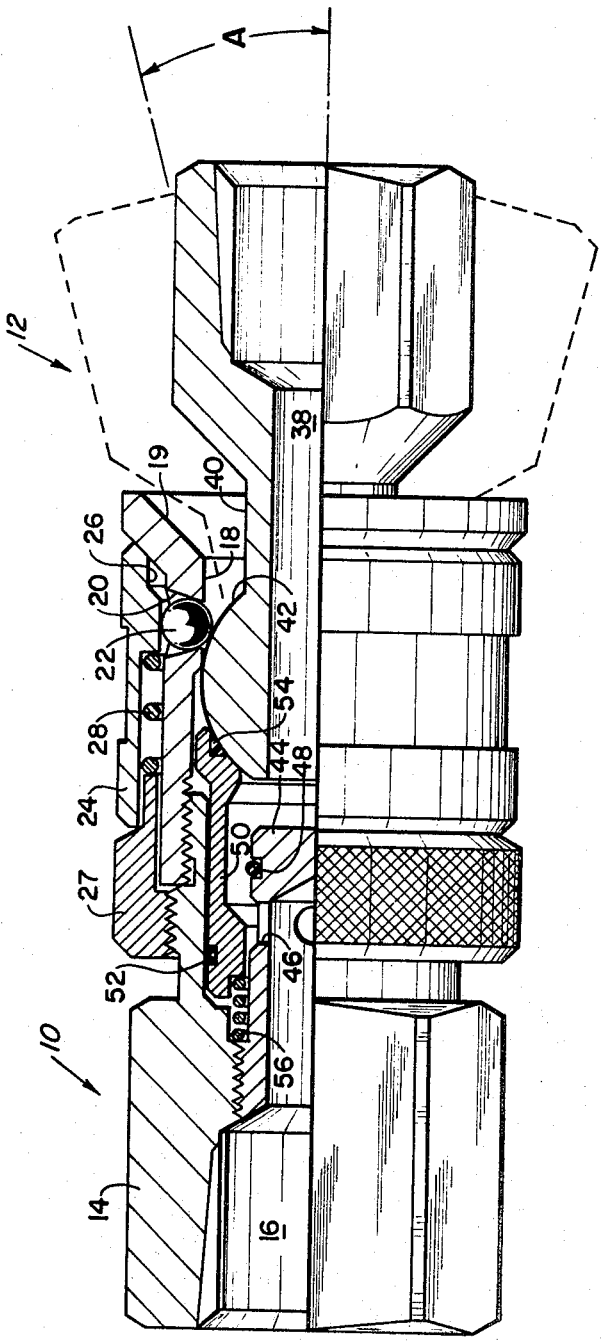
FIGURE 4 is a view, in partial section, of the coupling of FIGURE 3 in the engaged position.

Referring now to FIGURES 3 and 4, a valved coupling built in accordance with the present invention is shown there. Since the coupling of FIGURES 3 and 4 is generally similar to that of FIGURES 1 and 2 except that the housing 10 of the coupling of FIGURES 3 and 4 is valved to close the fluid flow passage through the housing 10 when the nipple is removed from the housing, the same reference numerals have been affixed to the parts of the coupling that are generally the same as the parts shown in FIGURES 1 and 2. The items numbered the same in FIGURES 3 and 4 as they are numbered in FIGURES 1 and 2 are generally similar and operate in the same way. For brevity of description, the functions of there numbered parts will not be repeated here.

To provide the valved coupling of FIGURES 3 and 4, the flow passage 16 of housing 10 terminates in an end wall 44. Radial passages 46 formed through the wall of flow passage 16 permits fluid communication between the flow passage 16 and the nipple-receiving passage 18 of the housing 10. The periphery of end wall 44 carries an O-ring 48 for a purpose to be hereinafter described.

In the coupling of FIGURES 3 and 4, a cylindrical valve 50 substitutes for the seal means cylinder 30 of the coupling of FIGURES 1 and 2. The cylindrical valve 50 is reciprocable within the housing body 14 between the position shown in FIGURE 3 where it effectively blocks flow of fluid from the flow passage 16 to the nipple-receiving passage 18 and the position shown in FIGURE 4 where fluid flow may occur through the radial passages 46 between flow passage 16 and the nipple flow passage 38 after the nipple 12 has been inserted into the housing 10.

As seen in FIGURES 3 and 4, the cylindrical valve 50 has an O-ring 52 to provide sliding-sealing contact between the cylindrical valve 50 and housing body 14. Further, the cylindrical valve 50 has a seal ring 54 which sealingly connects to the spherical section 42 of nipple 12 when the nipple is inserted into the housing. A helical spring 56 urges the cylindrical valve 50 to the position shown in FIGURE 3.

The nipple 12 of the embodiment of the invention shown in FIGURES 3 and 4 is identical to the nipple 12 of the embodiment of the invention shown in FIGURES 1 and 2. When the nipple 12 of FIGURES 3 and 4 is inserted into the nipple-receiving passage 18, the spherical section 42 of nipple 12 abuts the seal ring 54 of cylindrical valve 50 and urges cylindrical valve 50 to the left as viewed in FIGURES 3 and 4 against the force of spring 56. This action permits fluid communication through flow passage 16 of housing 10, through the radial passages 46, and into flow passage 38 of nipple 12.

When the nipple 12 is withdrawn from housing 10, the cylindrical valve 50 assumes the position shown in FIGURE 3 and the O-ring 48 sealingly connects the end wall 44 with the valve 50 to prevent passage of fluid out of the end of the housing 10.

It may be seen that with the coupling of the present invention, the nipple 12 may be inserted into the housing 10 when the two components are axially misaligned. Further, after the coupling is engaged, the housing 10 and nipple 12 may be axially misaligned. The construction of spherical section 42, combined with the locking balls 22, permit a universal movement of the coupling housing 10 and nipple 12 relative to each other. This universal movement results from the fact that the two parts of the coupling may be axially misaligned and, at the same time, may be rotated relative to each other. Thus, the coupling can permit relative rotation of two misaligned couplings if necessary or desirable.

According to the provisions of the patent statutes, I have explained the principle, preferred construction, and mode of operation of my invention, and have illustrated and described what I now consider to represent its best embodiments. However, I desire to have it understood that, within the scope of the appended claims, the invention may be practiced otherwise than as specifically illustrated and described.

I claim:
(a) a housing adapted to removably receive a nipple, said housing including a flow passage, a nipple-receiving passage having a cylindrical internal surface with a funnel-like end portion, a plurality of locking balls radially movable partially into said nipple-receiving passage to lock said nipple therein and retractable radially outwardly from said nipple-receiving passage to release said nipple, said locking balls being located axially adjacent to said funnel-like end portion, and an overlying sleeve axially reciprocable between a locking position where said sleeve locks said locking balls partially within said nipple-receiving passage and a release position where said locking balls may be retracted radially from said nipple-receiving passage; and (b) a nipple formed with
  (1) a flow passage therethrough;
  (2) a cylindrical external surface terminating in an external surface of spherical section on the end of said nipple, said nipple cylindrical external surface being substantially smaller in diameter that the diameter of said housing nipple-receiving passage and the diameter of said spherical section being constant and of such size that said spherical surface is contiguous to said nipple-receiving passage cylindrical internal surface when said nipple is within said passage;
  (3) the major portion of said spherical section being insertable within said housing nipple-receiving passage axially inwardly of said locking balls so that said locking balls, when moved radially inwardly, contact said spherical section radially outwardly of said nipple cylindrical external surface and prevent axial removal of said nipple from said housing, said nipple spherical section permitting the axis of said nipple to cant angularly relative to the axis of said housing while said coupling is in a connected condition; and (c) cylindrical seal means formed with
  (1) a sliding sealing connection to said housing; and
  (2) a sealing connection to said nipple formed by urging said cylindrical seal means against said nipple spherical surface when said nipple is inserted into said housing, whereby a continuous, fluid-tight passage is formed through said housing and said nipple.

2. The coupling of claim 1 wherein said locking balls are located near the end of said nipple-receiving passage and said nipple cylindrical external surface is small enough diametrically that the axis of said nipple may be canted at an angle of 15° or more to the axis of said housing nipple-receiving passage while said coupling is connected.

3. The coupling of claim 1 wherein said seal means is formed from a cylindrical member reciprocably mounted in said housing and having an O-ring seal in slidingly sealing connection with said housing and a seal ring abutting said nipple spherical surface when said nipple is inserted into said housing, said seal means cylindrical member being spring biased against said nipple.

4. The coupling of claim 1 wherein said housing has a valve formed therein to close said housing flow passage when said nipple is removed from said housing and to be opened when said nipple is inserted into said housing nipple-receiving passage.

5. The coupling of claim 1 wherein said seal means also serves as a longitudinally reciprocable valve to close said housing flow passage when said nipple is removed from said housing and to open said flow passage when said nipple is inserted into said housing nipple-receiving passage.

6. The coupling of claim 1 wherein said housing flow passage terminates in an end wall disposed within said housing nipple-receiving passage, a plurality of radial passages within said flow passage connect said flow passage to said nipple-receiving passage, a cylindrical valve member is disposed to slide over said flow passage between a closed position where said radial passages are blocked by said cylindrical valve member and an open position where said radial passages permit fluid flow between said flow passage and said nipple-receiving passage, a sliding sealing connection between said housing and said cylindrical valve member and a sealing connection between said nipple and said cylindrical valve member when said nipple is inserted into said housing whereby said cylindrical valve member serves the dual function of a valve member and said seal means.

References Cited
UNITED STATES PATENTS

| | | | |
|---|---|---|---|
| 2,070,013 | 2/1937 | Krannack | 285—316 |
| 2,199,588 | 5/1940 | Cobham et al. | 244—135 |
| 2,730,382 | 1/1956 | De Mastri | 251—149.6 |
| 2,848,255 | 8/1958 | Klein et al. | 285—267 |
| 3,034,809 | 5/1962 | Greenberg | 285—267 |
| 3,052,261 | 9/1962 | Nyberg | 251—149.6 |

M. CARY NELSON, *Primary Examiner.*

W. R. CLINE, *Assistant Examiner.*

U.S. Cl. X.R.
285—267, 277, 316